United States Patent [19]

Baskett

[11] Patent Number: 5,589,703

[45] Date of Patent: Dec. 31, 1996

[54] EDGE DIE BOND SEMICONDUCTOR PACKAGE

[75] Inventor: Ira E. Baskett, Tempe, Ariz.

[73] Assignee: Motorola, Inc., Schaumburg, Ill.

[21] Appl. No.: 431,217

[22] Filed: Apr. 28, 1995

[51] Int. Cl.$^6$ .................................................. H01L 29/82
[52] U.S. Cl. ........................ 257/419; 257/414; 257/415; 257/417; 257/418
[58] Field of Search ................................ 257/414, 415, 257/416, 417, 418, 419, 420

[56] References Cited

U.S. PATENT DOCUMENTS 4,873,871  10/1989  Bai et al. ................................ 257/419

*Primary Examiner*—Carl Whitehead, Jr.
*Attorney, Agent, or Firm*—Miriam Jackson; George C. Chen

[57] ABSTRACT

An edge die bond semiconductor package including a semiconductor die having an active major surface and a mounting edge substantially orthogonal to the active surface, a base having a mounting surface, and material affixing the mounting edge of the semiconductor die to the mounting surface of the base.

11 Claims, 3 Drawing Sheets

EDGE DIE BOND SEMICONDUCTOR PACKAGE

FIELD OF THE INVENTION

The present invention pertains to semiconductor die mounting. More particularly, the present invention pertains to packages in which semiconductor die are mounted to relieve temperature coefficient of expansion problems.

BACKGROUND OF THE INVENTION

In many industries there is a need for large quantities of low cost and reliable sensing devices. As a specific example, the automotive industry requires a high volume of accelerometers used in ride control, inertial navigation, and crash sensing for airbag deployment. In each of these applications as well as many others, reliability, and low costs are key requirements. While large scale mechanical devices have long been known, they are not capable of meeting these requirements. Thus, micromechanical sensors such as pressure sensors and accelerometers are being actively pursued.

In sensors, as well as many other semiconductor devices, a major problem that arises is the mounting of the active die on a base to provide the required stability and the necessary means for further mounting the device in the final operating environment. Micromachined pressure sensors, for example, include a diaphragm or very thin major surface with a scribe grid, or window frame type, surrounding edge. The grid edges are then affixed to the surface of a base or mounting member with the diaphragm parallel and spaced from the mounting surface of the base. Generally, the base is designed to be affixed to a surface in the operating environment and is formed of material compatible with that environment, i.e. metal or the like. The problem is that the material of the base generally has a different temperature coefficient of expansion (TCE) than the semiconductor material of the diaphragm and surrounding grid. Thus, changes in temperature result in expansion and contraction of the grid with the base, which appear as changes in the pressure or other stress being sensed or, worse, result in physical damage to the sensor.

In an attempt to solve this problem, one prior art structure mounts the diaphragm and surrounding grid on the surface of the base using a flexible adhesive material, such as silicone gel or silicone RTV. The flexible adhesive is used to isolate the diaphragm and surrounding grid from the base so that stress in the base or differences in TCE are not transmitted to the sensor and sensed. These flexible adhesives raise another problem which is that they generally react badly to certain environments, e.g. silicon RTV swells in the presence of some solvents. Also, the flexible adhesive operates like a spring and eventually weakens wire bonds that are fixedly attached between the sensor and the base by ultrasonic action and the like. Thus, sensors using flexible adhesives are limited in the environments in which they can be used.

Other prior art methods of isolating the diaphragm and surrounding grid from stresses caused by TCE, is the use of tall glass pedestals of semiconductor material mounted between the grid and the base. However, such pedestals are expensive, because they use large quantities of semiconductor material and are hard to fabricate because of the longer port or tunnel connecting the diaphragm to the environment being sensed. Also glass tubes are used to convey the environment to the surface of the diaphragm, which tubes are again expensive because of the mounting and assembly problems.

Another problem arises, especially in pressure sensors, because pressure sensors must allow the environment inside of the package so that the pressure can be sensed. In corrosive environments, for example, this can be detrimental to sensing circuitry formed on the diaphragm. That is, the circuitry side of the diaphragm is susceptible to corrosion, contamination, and galvanic action. Attempts to form a barrier between the sensing circuitry and the environment always impact reliability and cost. One prior art structure, for example, employs a metal can type package with a corrugated stainless steel diaphragm and silicone oil to transmit pressure to the sensing die. In the above described flexible mounting scenario, the wires are covered by silicone gel in an attempt to keep ions off the die surface, which in turn creates high stresses on the wires due to thermal effects, air bubble formation in the gel, swelling caused by solvents, and die motion due to pressure cycles expanding and contracting the silicone RTV.

Further, as die area decreases, as it naturally will in the sensor field, the flexible adhesive becomes a narrow column which is even more unstable at the wire bonds, can result in die tilt at the bond between the die and the base, and is difficult to be kept open at the center of the die to allow for pressure sensing. This can be seen more clearly by noting that the flexible adhesive resembles a doughnut with a very small hole in the center.

It would be highly advantageous, therefore, to remedy the foregoing and other deficiencies inherent in the prior art.

Accordingly, it is an object of the present invention to provide improvements in mounting of semiconductor devices.

Another object of the invention is to reduce temperature sensitivity of surface micromachined sensors.

And another object of the invention is to provide improved methods of mounting semiconductor sensors to allow use of the sensors in virtually any environment.

A further object of the invention is to provide improved methods of mounting semiconductor sensors to allow for future reduction in size without altering the mounting structures.

A still further object of the invention is to provide improved methods of mounting semiconductor sensors to reduce stress, corrosion, and contamination of electrical circuits and leads of the sensors.

SUMMARY OF THE INVENTION

Briefly, to achieve the desired objects of the instant invention an edge die bond semiconductor package is provided including a semiconductor die having an active major surface and a mounting edge substantially orthogonal to the active surface, a base having a mounting surface, and material affixing the mounting edge of the semiconductor die to the mounting surface of the base.

Also, a method of fabricating an edge die bond semiconductor package is disclosed including the steps of providing a semiconductor die having an active major surface and a mounting edge substantially orthogonal to the active surface; micromachining the semiconductor die to form a sensor diaphragm positioned in the major surface and a grid surrounding the diaphragm and defining a depression in the semiconductor die, providing a constraint die of material having a substantially similar temperature coefficient of expansion as the semiconductor die, micromachining the constraint die to form a cooperating surface to mate with the grid of the semiconductor die and a mounting edge substantially orthogonal to the cooperating surface. The semiconductor die and the constraint die are chemically bonded together so that a sensor cavity is defined between the diaphragm and the cooperating surface with the diaphragm defining one wall of the sensor cavity, and the semiconductor die and the constraint die are further bonded with the mounting edge of the semiconductor die and the mounting edge of the constraint die forming a single mounting edge substantially orthogonal to the diaphragm. A base having a mounting surface is provided and the single mounting edge of the semiconductor die and the constraint die are affixed to the mounting surface of the base.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
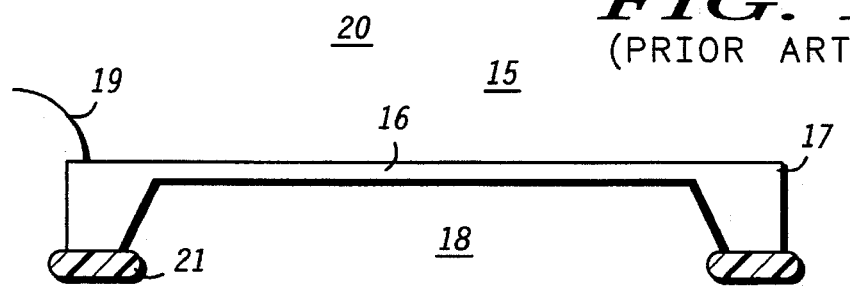
FIG. 1 is a simplified sectional view of a prior art sensor package.

Turning now to the drawings in which like reference characters indicate corresponding elements throughout the several views, attention is first directed to FIG. 1 in which is illustrated a simplified sectional view of a typical prior art sensor 15. Sensor 15 includes a diaphragm 16 extending between a surrounding grid (or shoulder) 17. In practice, sensor 15 is formed from a block of semiconductor material, having a depth approximately equal to the depth of grid 17, by micromachining (etching) depression 18 in a major surface to form diaphragm 16. Sensing circuitry connected to an external lead 19 is formed in the surface of diaphragm 16 for sensing stresses in diaphragm 16. Sensor 15 is mounted in a package by affixing the lower surface of grid 17 to a fixed surface 20 by means of a flexible material 21 (e.g. silicone rubber).

The major problem with this type of sensor is that flexible material 21 is susceptible to many solvents, acids and bases. Many solvents, for example, cause material 21 to expand which means that lead 19 must be affixed to any external circuitry so as to allow some relative movement. Also, the sensor can only be used to sense very limited environments.

Figure 2:
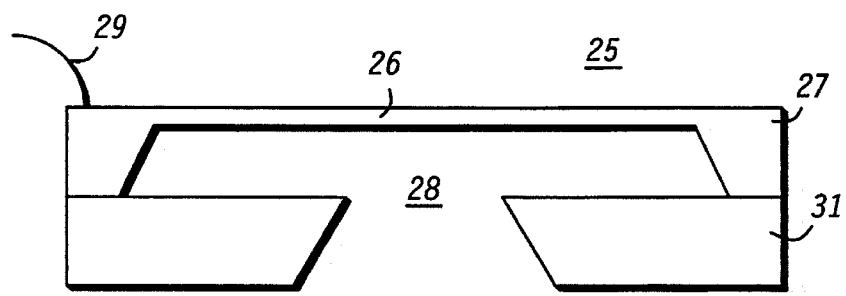
FIG. 2 is a simplified sectional view of another prior art package.

Referring now to FIG. 2, a simplified sectional view of another typical prior art sensor 25 is illustrated. Sensor 25 includes a diaphragm 26 and surrounding grid 27, similar to that described in conjunction with FIG. 1. Diaphragm 26 is formed by micromachining a depression 28 in a block of material, similar to the above description. Sensing circuitry connected to an external lead 29 is formed in the surface of diaphragm 26 for sensing stresses in diaphragm 26. A micromachined semiconductor constraint 31 is used to mount sensor 25 in a package. The lower surface of grid 27 is affixed to constraint 31 by standard bonding techniques and constraint 31 is then affixed to a surface 30 by some convenient means such as a flexible adhesive, etc.

In this type of sensor, grid 27 is fixedly bonded to constraint 31, which is generally formed of the same type of material as grid 27 (silicon), so that there is no danger of relative movement. However, constraint 31 must still be affixed to surface 30, or in a package, which introduces the temperature coefficient of expansion factor. Thus, constraint 31 may protect grid 27 and diaphragm 26 from damage but it will still introduce stresses and the like which will effect the operation of sensor 25.

Figure 3:
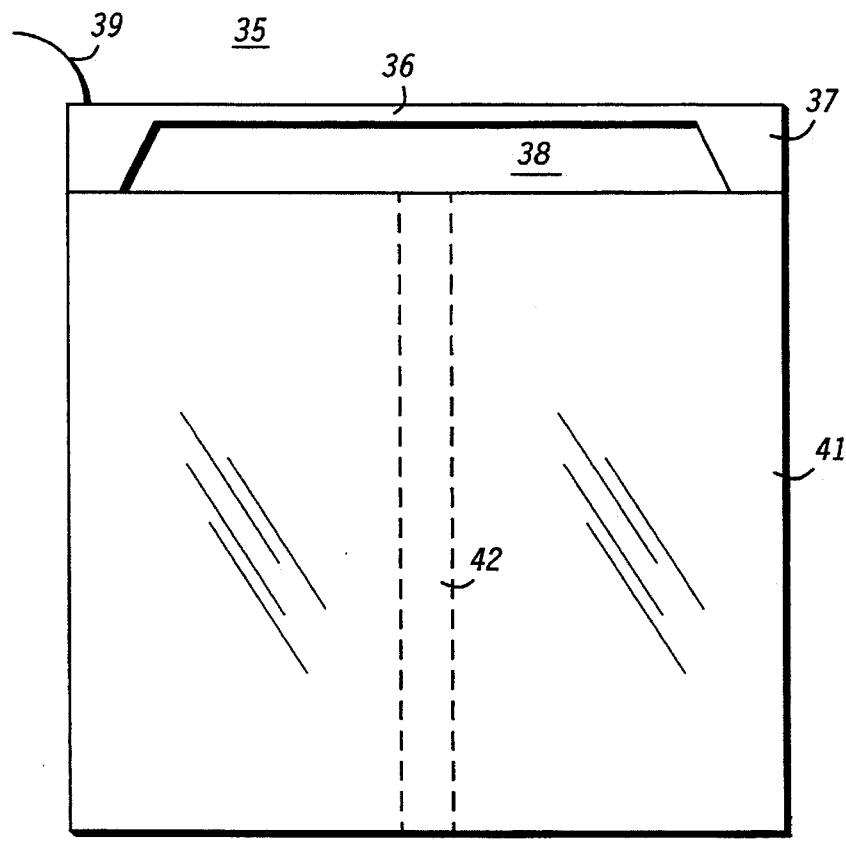
FIG. 3 is a simplified sectional view of another prior art package.

Referring now to FIG. 3 a simplified sectional view of still another typical prior art sensor 35 is illustrated. Sensor 35 includes a diaphragm 36 and surrounding grid 37, similar to that described in conjunction with FIG. 1. Diaphragm 36 is formed by micromachining a depression 38 in a block of material, similar to the above description. Sensing circuitry connected to an external lead 39 is formed in the surface of diaphragm 36 for sensing stresses in diaphragm 36. A tall glass pedestal 41 is used to mount sensor 35 in a package. The lower surface of grid 37 is mounted on pedestal 41 by standard bonding techniques and pedestal 41 is then affixed to a surface 40 by some convenient means such as a flexible adhesive, etc.

In this type of sensor, pedestal 41 is relatively expensive and adds greatly to the weight and size of sensor 35. Also, in many types of sensors pedestal 40 must have an opening 42 extending through the center thereof in communication with depression 38 to allow the sensed atmosphere into depression 38. The problem here is that opening 42 is so long it introduces a delay in the operation.

Figure 4:
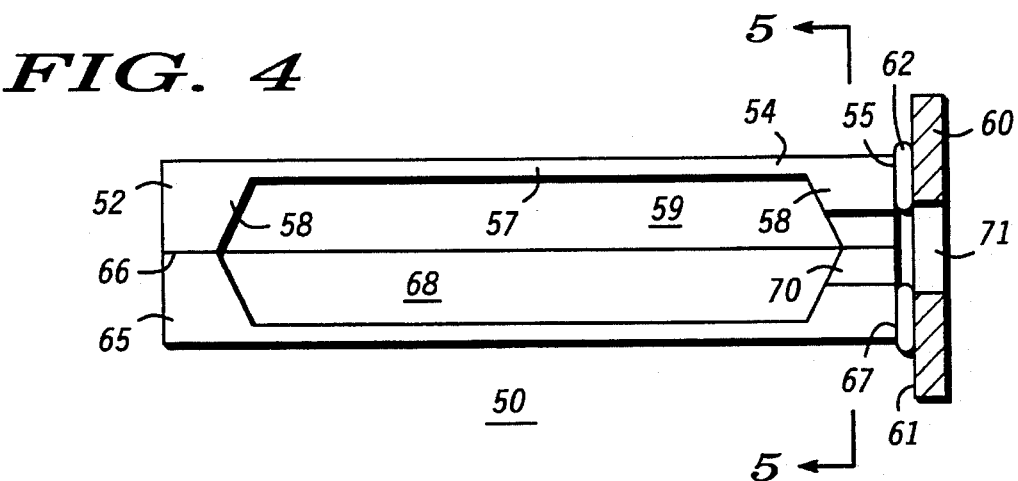
FIG. 4 is an enlarged sectional view of a pressure sensor in accordance with the present invention.
Figure 5:
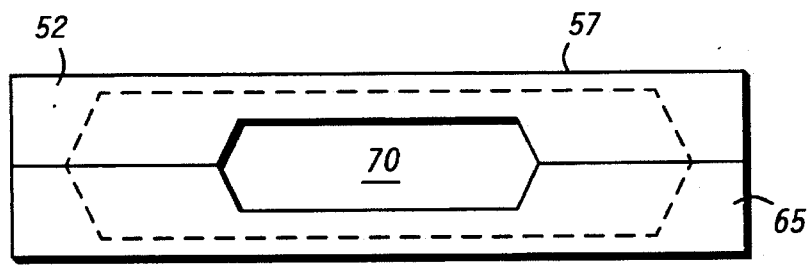
FIG. 5 is a sectional view of the structure of FIG. 4.

Referring now to FIGS. 4 and 5, an edge die bond semiconductor package 50 in accordance with the present invention, is illustrated. To enhance the understanding of package 50, FIG. 4 is one sectional view of package 50 and FIG. 5 is another sectional view of package 50 as seen from the line 5—5 of FIG. 4. In this specific embodiment, illustrated for purposes of explanation of the invention, package 50 is a pressure sensor (hereinafter referred to as sensor 50) but it will be understood that many other types of semiconductor devices which are susceptible to temperature coefficients of expansion in the mounting structure could incorporate the present invention.

In the specific embodiment illustrated in FIGS. 4 and 5, sensor 50 includes a semiconductor die 52 having an active major surface 54 and a mounting edge 55, with edge 55 oriented substantially orthogonal to active surface 54. Semiconductor die 52 includes a sensor diaphragm 57 formed in major surface 54 and a grid 58 surrounding diaphragm 57 so as to define a depression 59 in semiconductor die 52. A base 60 is also provided, which has a mounting surface 61 with mounting edge 55 fixedly mounted thereon by means of some material, such as a die bond film 62. While the edge mounting of semiconductor die 52 is sufficient TCE protection for some semiconductor devices in some applications, as will be explained presently, additional structure is provided in conjunction with sensor 50 for reasons that will become apparent presently.

In this specific embodiment, sensor 50 further includes a constraint die 65 having a cooperating surface 66 formed to mate with the surface of grid 58 and a mounting edge 67 substantially orthogonal to cooperating surface 66 and diaphragm 57. Semiconductor die 52 and constraint die 65 are formed of materials having substantially similar temperature coefficients of expansion. In the present specific example, both semiconductor die 52 and constraint die 65 are formed of silicon. Generally, semiconductor die 52 and constraint die 65 are formed by micromachining and are chemically bonded together by any of the techniques commonly used in the semiconductor industry for wafer bonding.

In this embodiment constraint die 65 is micromachined to form a central depression 68 generally in register with depression 59 when die 52 and 65 are fixedly bonded together. Depressions 59 and 68 cooperate to define a sensor cavity between diaphragm 57 and constraint die 65 with diaphragm 57 defining one wall of the sensor cavity. Semiconductor die 52 and constraint die 65 are further bonded with mounting edge 55 of semiconductor die 52 and mounting edge 67 of constraint die 65 forming a single mounting edge substantially orthogonal to the diaphragm 57. Generally, in the fabrication of sensor 50 semiconductor die 52 and constraint die 65 are formed and fixedly bonded together and then the single mounting surface is fixedly attached to mounting surface 61 of base 60.

In many sensors (e.g. gauge type sensors) it is essential to provide a means of communication between the sensor cavity and the atmospheres being sensed. To this end, grid 58 of semiconductor die 52 has a groove etched therein and an edge of constraint die 65 has a groove formed therein, which grooves cooperate to define an inlet port 70 in communication with the sensor cavity. It will of course be understood that the sensor cavity and/or inlet port 70 could be formed exclusively in semiconductor die 52 or constraint die 65, if desired. Also base 60 has an exterior port 71 defined therethrough and positioned so as to be in communication with inlet port 70. In many applications, exterior port 71 requires some precision in matching it to the sensor and any source to be sensed, in such applications Kovar is a good material for this purpose.

Thus, base 60 can be mounted so that exterior port 71 is in communication with an atmosphere, or source of gas, liquid, or other pressure to be sensed and the sensor cavity can be in communication with the gas, liquid, etc. without subjecting the exterior of sensor 50 to the gas, liquid, etc. This is especially advantageous when using sensor 50 to sense corrosive materials that might damage the circuitry on the outer surface of diaphragm 57. It will be understood, that silicon, for example, is one of the most resistant materials to solvents and corrosive environments and, with the configuration illustrated, only the silicon forming the sensor cavity is exposed.

Figure 6:
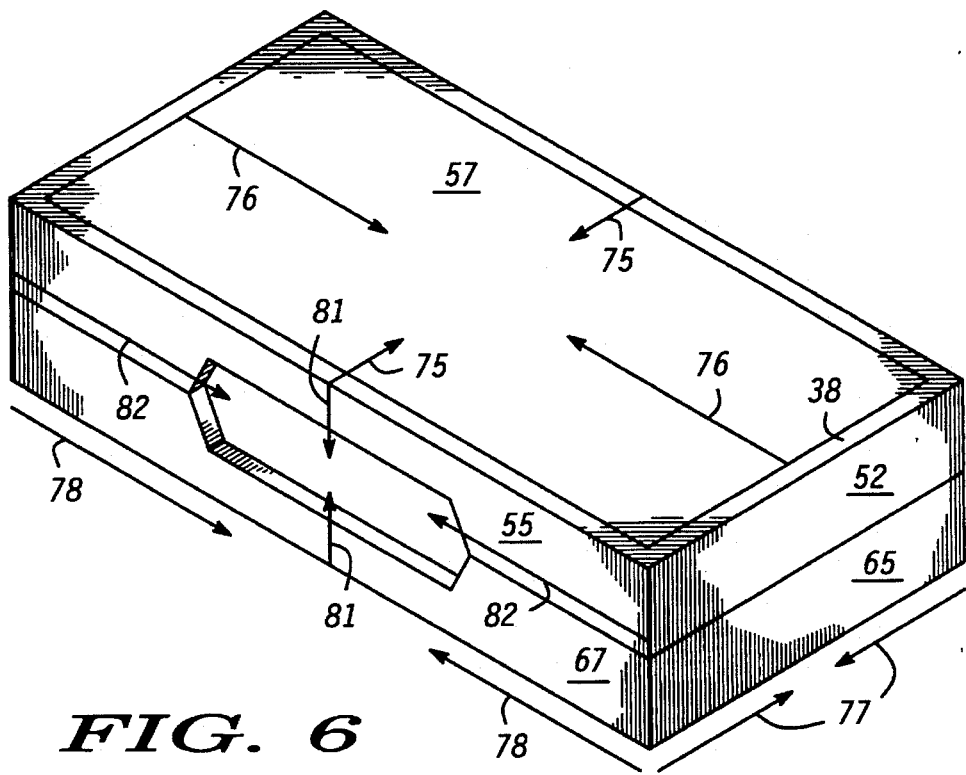
FIG. 6 is a perspective view of the pressure sensor of FIG. 4 illustrating the bond stress for various mountings.

Referring specifically to FIG. 6, semiconductor die 52 and constraint die 65 are illustrated in a perspective view to better explain the various stress present. Diaphragm 57 is illustrated with arrows 75 extending from the upper and lower edges of grid 58 to represent stress along this axis, which stress is sensed by strain gauges positioned along the axis, in a known manner. Similarly, arrows 76 extend from opposite sides of grid 58 and represent stress along an axis orthogonal to the axis represented by arrows 75. Again, strain gauges are positioned along this axis to measure stress in this direction. Thus, any diaphragm stress in any direction is measured by sensor 50.

When semiconductor die 52 and constraint die 65 are mounted at the bottom (as described in conjunction with FIGS. 1, 2 and 3), any stress developed as a result of TCE, etc. are in the same plane as diaphragm 57 and are directed along axes parallel with the axes of diaphragm 57, as represented by arrows 77 and 78, respectively. These stresses are transmitted directly to diaphragm 57 and are indistinguishable from applied pressure stresses represented by arrows 75 and 76. The magnitude of these stresses which is sensed by sensor 50 will depend on the sensitivity of semiconductor die 52, the thermal mismatch between semiconductor die 52, the compliance of die attach material and the thickness of isolating constraint die 65 (if included).

In the present disclosure, sensor 50 is edge mounted by means of mounting edges 55 and 67. Any thermal mismatch or other stresses developed as a result of the edge mounting are in a vertical plane and will be directed along axes represented by arrows 81 and 82. Here it should be noted that stresses represented by arrows 81 and 82 are directed orthogonal to the stresses represented by arrows 75 and 76, respectively, and can always be distinguished from applied pressure stresses regardless of all the factors mentioned above or the magnitude of the package stress.

Because stresses in the mounting plane are orthogonal to diaphragm 52, mounting edges 55 and 67 can be hard bonded to base 60. The preferred die bond is a hard bond using a material that is unaffected by solvents, acids, or bases. Thus, the use of silicone gel, silicon RTV and other flexible bonds, with their inherent problems, is eliminated. For example, because the movement produced by flexible mounting is eliminated, the package can be connected by conventional wire bonding techniques, which reduces cost and improves reliability. Also, sensors in accordance with the present invention are capable of being used in environments previously shunned by prior art electronics and the reliability is much higher than other mechanical devices. Further, because the new package can be fabricated using simple micromachining techniques, the cost is not increased and the sensitivity is greater while size can easily be reduced.

Figure 7:
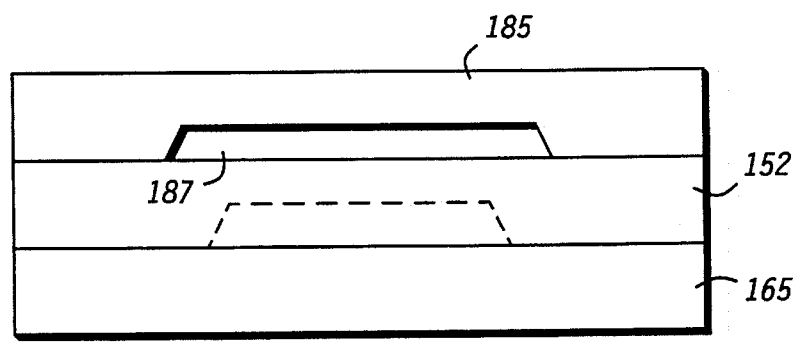
FIG. 7 is an end view of an absolute pressure sensor in accordance with the present invention.
Figure 8:
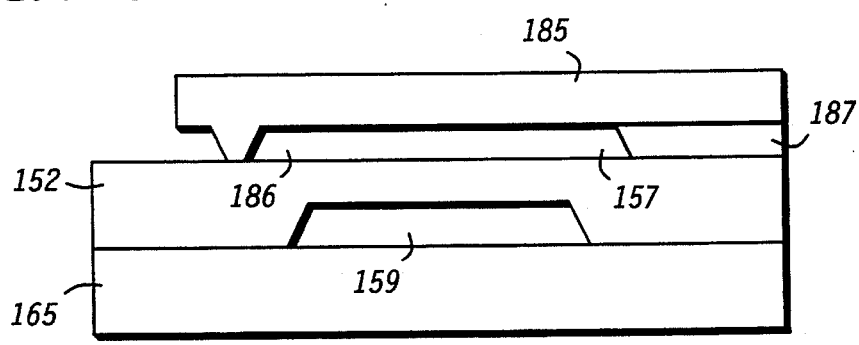
FIG. 8 is a sectional view of the structure of FIG. 7.

Referring now to FIGS. 7 and 8, an absolute pressure sensor 150 in accordance with the present invention is illustrated. Absolute pressure sensor 150 includes a semiconductor die 152 having a depression 159 formed therein and defining a diaphragm 157 as one wall thereof. A constraint die 165, formed in this embodiment as flat piece of material, is bonded over depression 159 to form a completely closed sensor cavity. A cover die 185 is provided, having a depression 186 formed therein and a connecting channel 187. Cover die 185 is affixed to the upper surface of semiconductor die 152 so the a second cavity is formed with diaphragm 157 defining the lower surface thereof. Channel 187 also cooperates with the upper surface of semiconductor die 152 to form an inlet port in communication with the second cavity. Generally, cover die 185 is constructed and mounted so that bond wires and some of the laser trim resistors in the upper surface of semiconductor die 152 are outside of the area covered by cover die 185.

Figure 9:
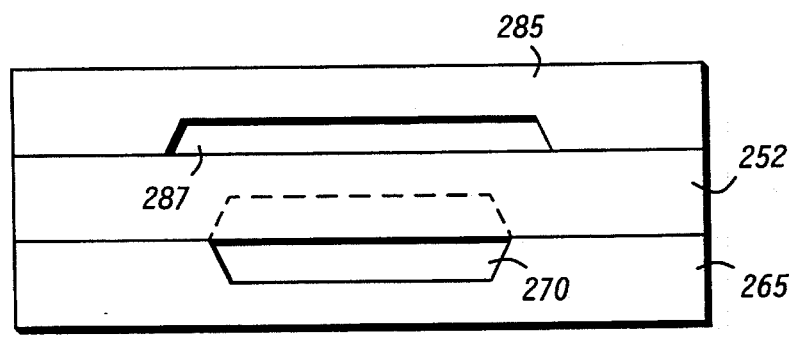
FIG. 9 is an end view of a differential pressure sensor in accordance with the present invention.
Figure 10:
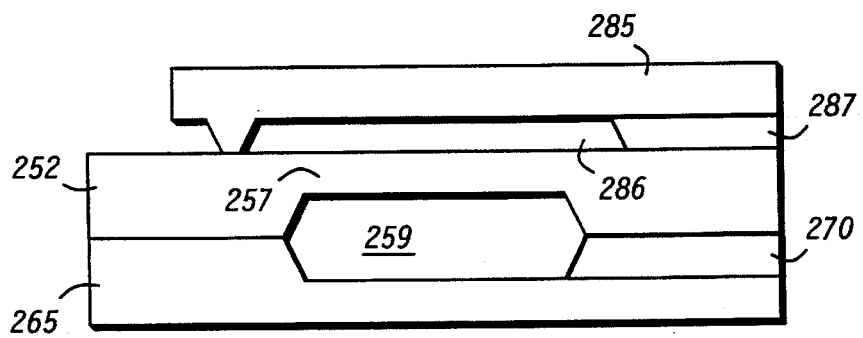
FIG. 10 is a sectional view of the structure of FIG. 9.

Referring now to FIGS. 9 and 10, a differential pressure sensor 250 in accordance with the present invention is illustrated. Differential pressure sensor 250 includes a semiconductor die 252 having a depression 259 formed therein and defining a diaphragm 257 as one wall thereof. A constraint die 265 is bonded over depression 259 to form a sensor cavity. An inlet port 270 is formed by the cooperation of a channel in constraint die 265 and the lower surface of semiconductor die 252. A cover die 285 is provided, having a depression 286 formed therein and a connecting channel 287. Cover die 285 is affixed to the upper surface of semiconductor die 252 so the a second cavity is formed with diaphragm 257 defining the lower surface thereof. Channel 287 also cooperates with the upper surface of semiconductor die 252 to form an inlet port in communication with the second cavity. Generally, cover die 285 is constructed and mounted so that bond wires and some of the laser trim resistors in the upper surface of semiconductor die 252 are outside of the area covered by cover die 285.

Accordingly, a new and improved edge die bond semiconductor package has been disclosed which solves and/or eliminates many problems prevalent in prior art packages. The present novel package substantially reduces temperature sensitivity of surface micromachined devices and especially sensors. Further, utilizing the disclosed improved methods of mounting semiconductor sensors allows the use of the sensors in virtually any environment. Also, the disclosed improved methods of mounting semiconductor sensors allows for future reduction in size without altering the mounting structures. A still further advantage of the improved package and mounting methods is that stress, corrosion, and contamination of electrical circuits and leads of the sensors are eliminated or greatly reduced.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An edge die bond semiconductor package comprising:
   a semiconductor die having an active major surface and a mounting edge substantially orthogonal to the active major surface, wherein the semiconductor die includes a sensor diaphragm positioned in the active major surface and a grid surrounding the diaphragm and defining a depression in the semiconductor die;
   a base having a mounting surface; and
   material affixing the mounting edge of the semiconductor die to the mounting surface of the base.

2. An edge die bond semiconductor package as claimed in claim 1 including in addition a constraint die having a surface formed to mate with the grid of the semiconductor die, the semiconductor die and the constraint die being formed of materials having substantially similar temperature coefficients of expansion.

3. An edge die bond semiconductor package as claimed in claim 2 wherein the semiconductor die and the constraint die are both formed of silicon.

4. An edge die bond semiconductor package as claimed in claim 2 wherein the semiconductor die and the constraint die are affixed together to form a sensor cavity therebetween with the sensor diaphragm defining one wall of the sensor cavity, the grid and constraint die further define an inlet port in communication with the sensor cavity and the base includes an exterior port defined therethrough so as to be in communication with the inlet port.

5. An edge die bond semiconductor package as claimed in claim 4 wherein the semiconductor die and the constraint die are chemically bonded together so that the sensor cavity is isolated from an exterior of the package and communicates with the exterior only through the inlet and exterior ports.

6. An edge die bond semiconductor package as claimed in claim 5 wherein the package defines a differential pressure sensor and further includes a cover die having defined therein a depression and connecting channel, the cover die being affixed to the semiconductor die on a surface of the diaphragm opposite the sensor cavity with the diaphragm defining one wall of a second cavity in conjunction with the depression and the connecting channel forming a second port in communication with the second cavity.

7. An edge die bond semiconductor package as claimed in claim 2 wherein the package defines an absolute pressure sensor with the semiconductor die and the constraint die being affixed together to form a sensor cavity therebetween with the sensor diaphragm defining one wall of the sensor cavity, and the package further includes a cover die having defined therein a depression and connecting channel, the cover die being affixed to the semiconductor die on a surface of the diaphragm opposite the sensor cavity with the diaphragm defining one wall of a second cavity in conjunction with the depression and the connecting channel forming a second port in communication with the second cavity.

8. An edge die bond semiconductor package as claimed in claim 1 wherein the mounting edge of the semiconductor die is hard bonded to the mounting surface of the base and the material affixing the mounting edge of the semiconductor die to the mounting surface of the base is substantially unaffected by solvents, acids and bases.

9. An edge die bond semiconductor package comprising:
   a semiconductor die having an active major surface and a mounting edge substantially orthogonal to the active surface, the semiconductor die including a sensor diaphragm positioned in the major surface and a grid surrounding the diaphragm and defining a depression in the semiconductor die;
   a constraint die having a cooperating surface formed to mate with the grid of the semiconductor die and a mounting edge substantially orthogonal to the cooperating surface, the semiconductor die and the constraint die being formed of materials having substantially similar temperature coefficients of expansion;
   the semiconductor die and the constraint die being chemically bonded together so that a sensor cavity is defined between the diaphragm and the constraint die with the diaphragm defining one wall of the sensor cavity, the semiconductor die and the constraint die being further bonded with the mounting edge of the semiconductor die and the mounting edge of the constraint die forming a single mounting edge substantially orthogonal to the diaphragm;
   a base having a mounting surface; and
   material affixing the single mounting edge of the semiconductor die and the constraint die to the mounting surface of the base.

10. An edge die bond semiconductor package as claimed in claim 9 wherein the semiconductor die, the constraint die and the base are all formed of silicon.

11. An edge die bond semiconductor package as claimed in claim 10 wherein the semiconductor die grid and the constraint die further define an inlet port in communication with the sensor cavity and the base includes an exterior port defined therethrough so as to be in communication with the inlet port.

* * * * *